(12) United States Patent
Schinzel

(10) Patent No.: US 6,264,419 B1
(45) Date of Patent: Jul. 24, 2001

(54) ROBOT ARM

(75) Inventor: Fred Schinzel, Männedorf (CH)

(73) Assignee: Tecan Schweig AG, Männedorf (CH)

( * ) Notice: Subject to any disclaimer, the term of this patent is extended or adjusted under 35 U.S.C. 154(b) by 0 days.

(21) Appl. No.: 09/415,554

(22) Filed: Oct. 8, 1999

(30) Foreign Application Priority Data

Oct. 15, 1998 (EP) .................................................. 98119468

(51) Int. Cl.$^7$ ....................................................... B25J 5/04
(52) U.S. Cl. .................................. 414/751.1; 294/119.1; 901/16; 901/21; 901/39
(58) Field of Search ................................ 414/729, 749.1, 414/751.1; 901/16, 21, 30, 39; 294/119.1, 67.33

(56) References Cited

U.S. PATENT DOCUMENTS 3,076,673 * 2/1963 Kaplan et al. ...................... 294/67.33
4,005,782 * 2/1977 Crockett .................................. 901/16
4,591,198 * 5/1986 Monforte .......................... 294/119.1

* cited by examiner

*Primary Examiner*—Donald W. Underwood
(74) *Attorney, Agent, or Firm*—Notaro & Michalos P.C.

(57) ABSTRACT

A gripper housing (16) of a gripper (14) is suspended from two rotatable sliding bars the ends of which are connected to sleeves (50, 51). One of these is provided with a turning wheel (47) meshing with a turning pinion (48) nonrotatably connected with a tong housing (17) rotatably supported on the gripper housing (16). The other is provided with a gripper wheel (33) meshing with a gripper pinion (34) which is connected with gear wheels (38a, 38b) in the tong housing (17) via a gripper bolt (37) passing coaxially through the turning pinion (48). The gear wheels (38a, 38b) mesh with gear racks (52b) on sliders (39a, 39b) which are displaceably supported in the tong housing (17) and have gripping fingers (40a, 40b). By rotation of the first sliding bar, the sliders (39a, 39b) with the gripping fingers (40a, 40b) can be displaced relative to each other via the gripper wheel (33), gripper pinion (34), gripper bolt (37), and gear wheels (38a, 38b), while by rotation of the second sliding bar the tong housing (17) can be rotated via the turning wheel (47) and the turning pinion (48).

14 Claims, 7 Drawing Sheets

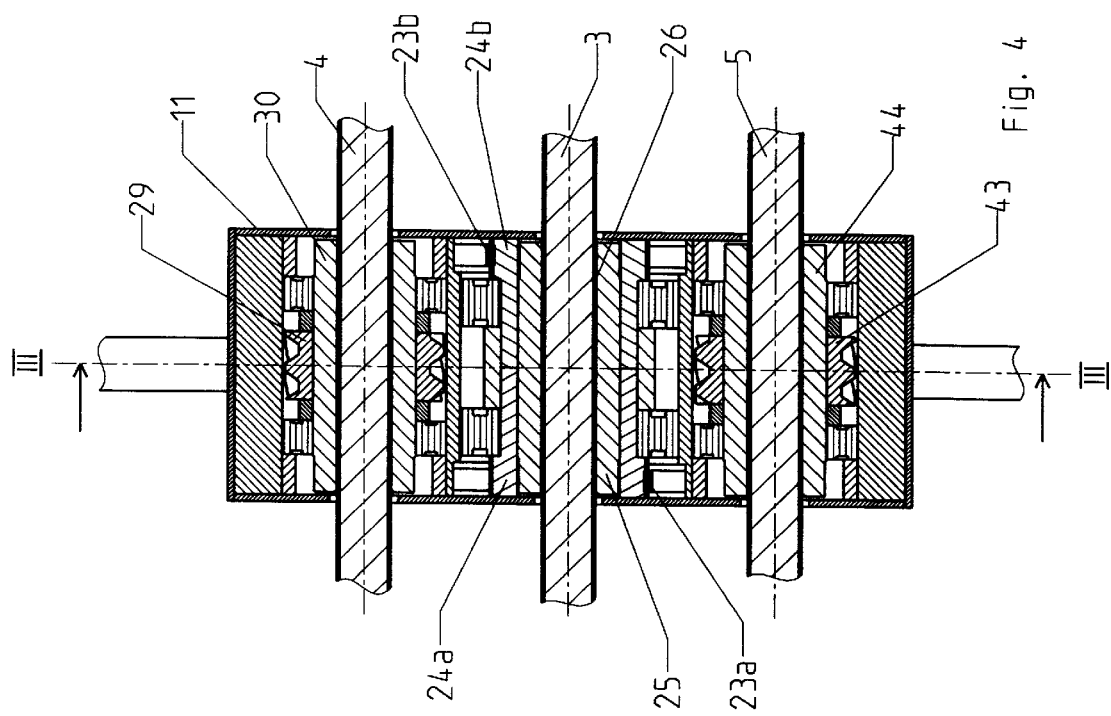
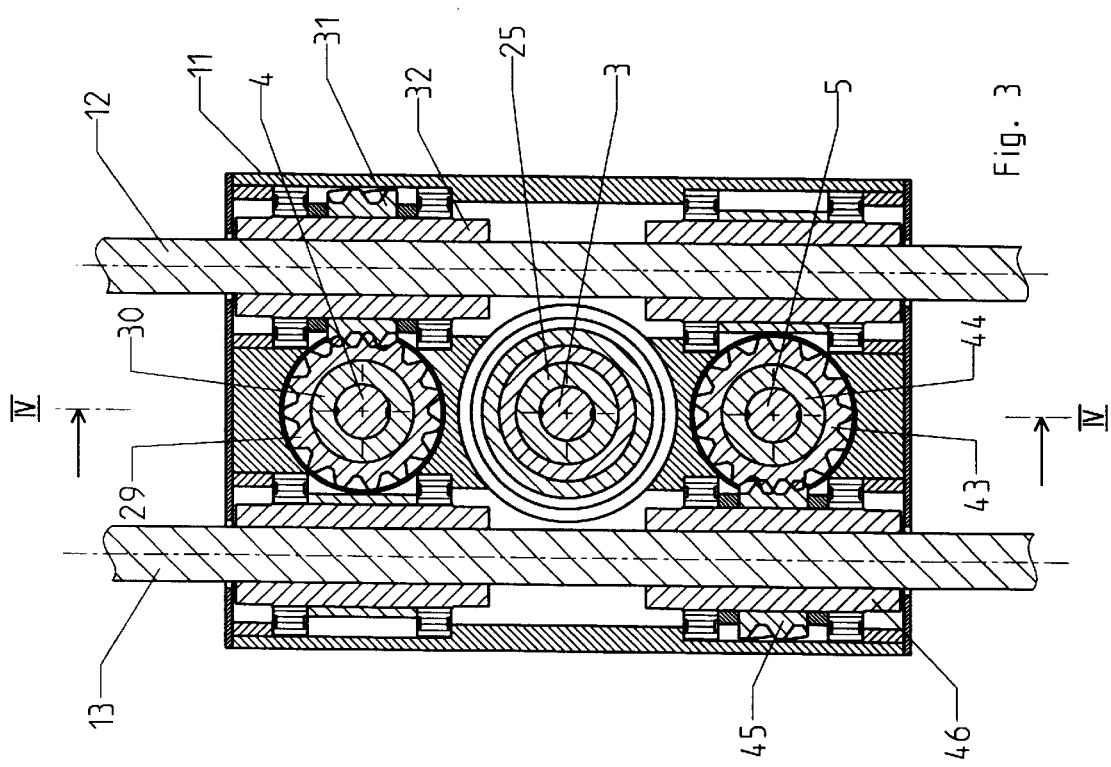

ROBOT ARM

FIELD OF THE INVENTION

The invention relates to a robot arm according to the preamble of claim 1. Such equipment is used for instance for the insertion of sample containers into and their removal from laboratory instruments or also for the handling and assembly of components on assembly belts.

PRIOR ART

From DE-A-38 06 148 there is known a robot arm of the generic type with a gripper mounted on a control rod. The opening and closing movements of the gripping fingers are actuated by pneumatic means. A gear wheel positioned between gear racks connected to the gripping fingers and meshing with the racks merely serves to make sure that their movements are in opposite directions. On account of the pneumatic drive, the resolution and accuracy with which particular positions can be approached is limited to values which are not sufficient for all applications. The pneumatic drives furthermore increase the weight of the modules and require pneumatic connections which complicate the construction. The gripper is not rotatable.

From the brochure "Automatische Handhabungstechnologie" [Automated handling technology] of the company AFAG AG in CH-4950 Huttwil, there is known a robot arm which is composed of two linear modules and a rotatable gripper module. Here, too, the modules are pneumatically driven, which entails the disadvantages mentioned above. Arrangements of linear and rotary modules which permit substantial freedom in the positioning of a working device are also known from EP-A-0 700 733 and EP-A-0 371 872. However, in neither of these documents the working device is formed as a gripper, so that the specific problems presented by a robot arm of the generic type will not occur there.

SUMMARY OF THE INVENTION

It is the aim of the invention to provide a robot arm of the generic type comprising a gripper the gripping movement of which is very accurate, reproducible and controllable with high resolution, and which furthermore is able to execute a rotational movement meeting the same requirements.

This aim is achieved by the features in the characterising part of patent claim 1. The robot arm according to the invention comprises a gripper which apart from its gripping movement is also able to execute a rotational movement and can be very precisely controlled with respect to both movements. The movements are transmitted to the gripper by mechanical means and can be generated by drives housed in a carrier that is stationary or merely displaceable along one axis. Since the gripper need not contain its own drives, its weight may thus be kept low. Also, pneumatic or electrical connections which otherwise often are disturbing and difficult to accommodate are not required for the same reasons.

BRIEF DESCRIPTION OF THE DRAWINGS

In the following the invention will be described in more detail with the aid of figures representing merely exemplary embodiments, and where FIG. 3 shows a vertical transverse section through the constituent part of FIG. 2 taken along III—III in FIG. 4, FIG. 4 is a vertical longitudinal section along IV—IV in FIG. 3.

DESCRIPTION OF THE PREFERRED EMBODIMENTS

Figure 1:
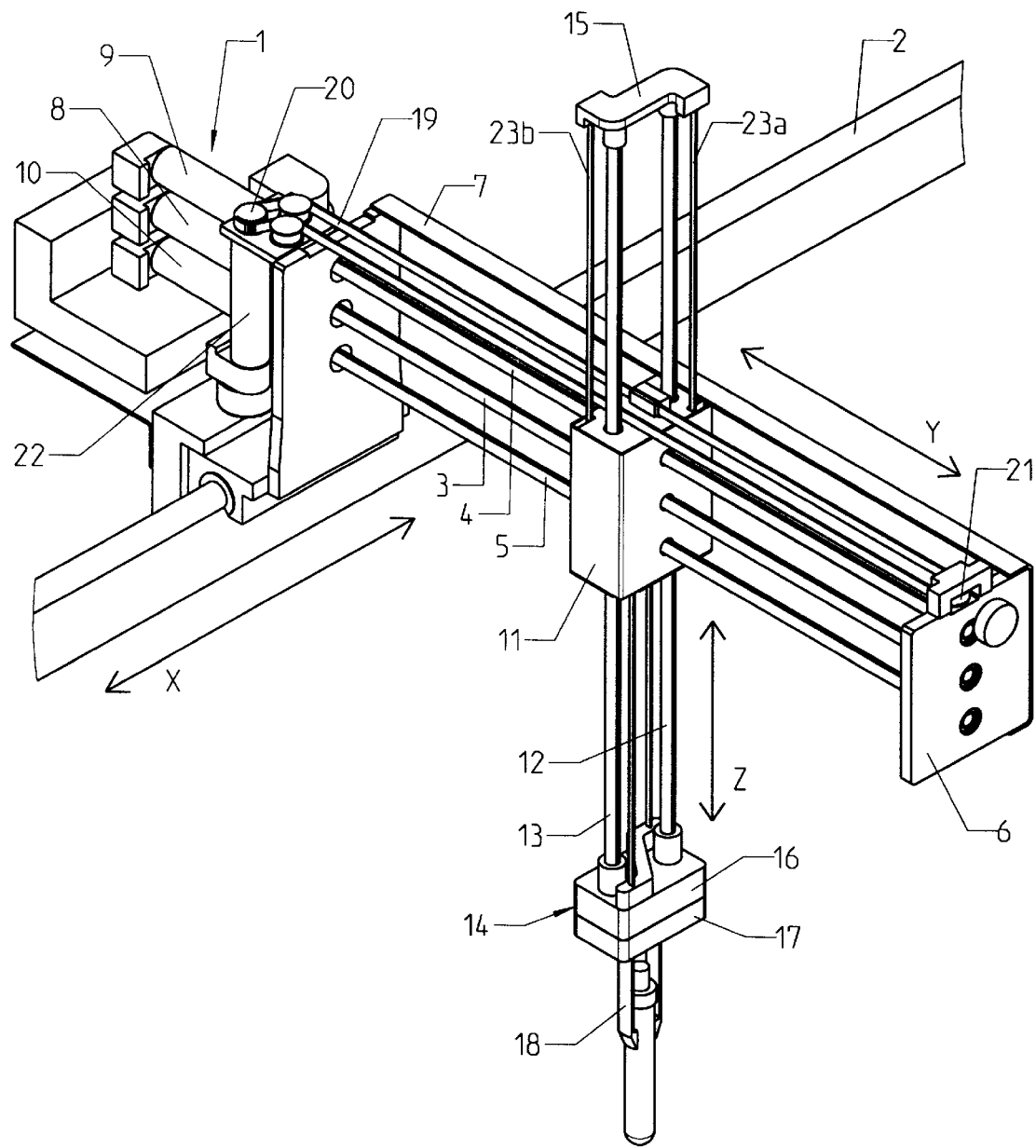
FIG. 1 is a perspective representation of a robot arm according to the invention in conformity with one exemplified embodiment.

The robot arm (FIG. 1) comprises as carrier a carriage 1 that can be displaced to and fro along a rail 2 running horizontally in an x-direction. In the simplest case and in a basically known manner, this may be realised with a direct-current servomotor in carriage 1 that is controlled by a central control unit and drives a pinion which engages with a gear rack integrated into the rail 2, directly or via a toothed belt.

Mounted on the carriage 1 are three supporting bars 3, 4, 5 arranged in parallel one below the other and projecting horizontally in a y-direction which is at a right angle with the x-direction. Their ends are mounted in a common stop plate 6 fastened via an angle bracket 7 on the carriage 1. The supporting bars 3, 4, 5 are nondisplaceably supported on the carriage 1, but are rotatable with the aid of three direct-current servomotors 8, 9, 10 that can be controlled independently of each other by the central control unit.

A slide 11 is suspended nonrotatably but displaceably in the y-direction from the supporting bars 3, 4, 5. This slide supports two sliding bars 12, 13 traversing it on both sides of the supporting bars 3, 4, 5 along a z-direction that is at right angles with both the x-direction and y-direction, and as a result is vertical. At their lower ends the sliding bars hold a gripper 14, while at their opposite, upper ends they are supported in a common yoke 15. The gripper 14 comprises an upper gripper housing 16 suspended nondisplaceably and nonrotatably from the ends of the sliding bars 12, 13, while a lower tong housing 17 holding downwardly projecting gripping tongs 18 is rotatably connected with the housing 16. The gripping tongs 18 comprise two gripping fingers that can be displaced relative to each other for opening and closing of the gripping tongs 18.

For its displacement in the y-direction, the slide 11 is fastened on a strand of an endless belt 19 that is designed as a toothed belt, is tensioned above the supporting bars 3, 4, 5 in parallel with them, runs over two deflection pulleys and a pinion 20 in the form of a gear wheel on the carriage 1, and is turned around at a deflection pulley 21 mounted on the stop plate 6. The pinion 20 is driven by a direct-current servomotor 22 controlled by the central control unit.

Figure 2:
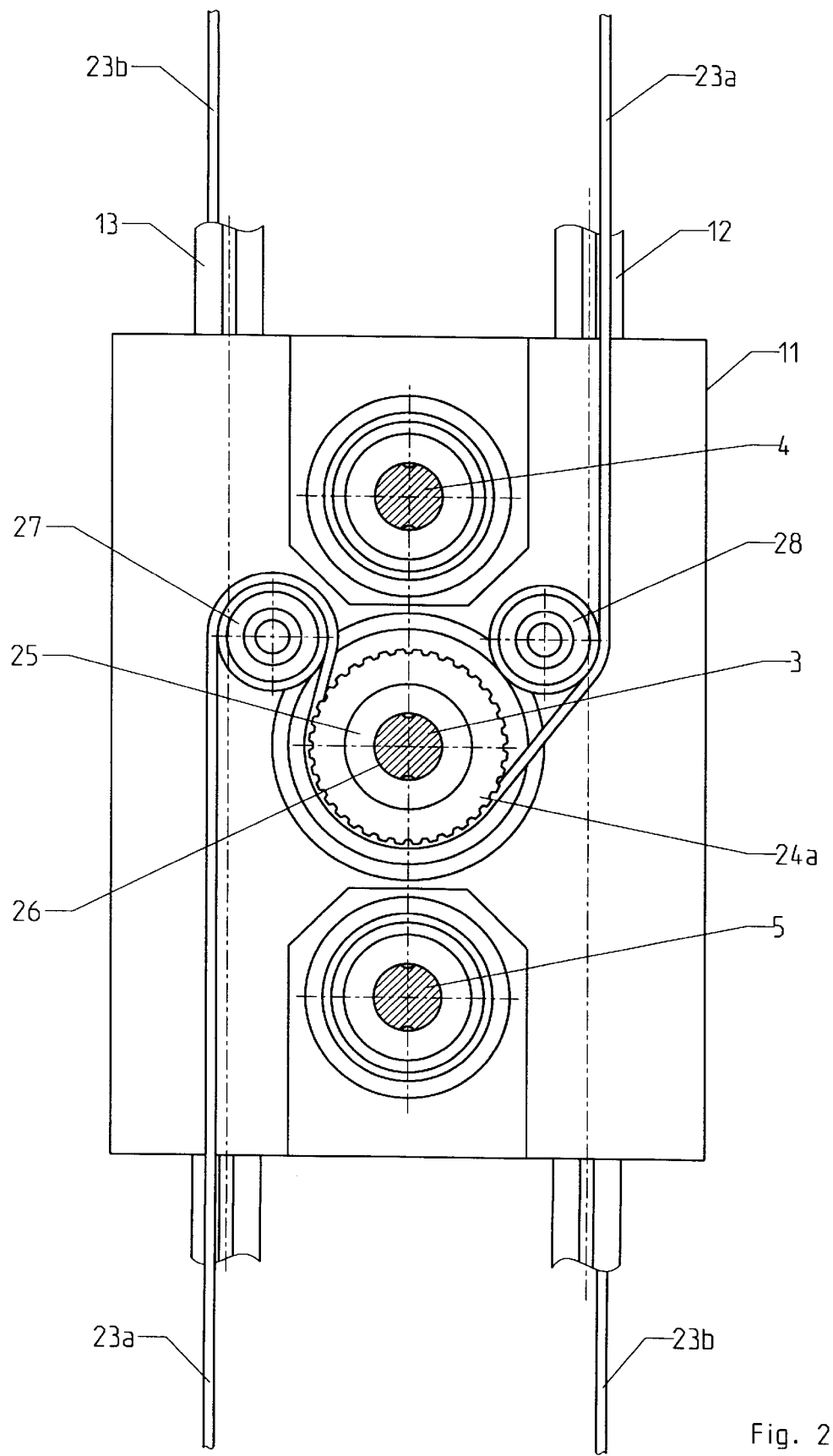
FIG. 2 shows a constituent part of the robot arm according to the invention represented in FIG. 1, with the cover removed.

The displacement of the sliding bars 12, 13 and of the gripper 14 in the z-direction, i.e., the raising and lowering of the gripper, is realised with the aid of a displacing gear which translates rotational movements of the first supporting bar 3 into corresponding displacing movements. It comprises two belts 23a, 23b again designed as toothed belts tensioned in parallel to and alongside the sliding bars 12, 13 from the gripper 14 to the yoke 15 at which their opposite ends are fastened. The displacing gear further comprises two displacing wheels 24a, 24b (FIGS. 2 to 4) designed as gear wheels and formed integrally with the opposite ends of a double sleeve 25 that is supported rotatably but nondisplaceably in the slide 11, and non-rotatably but displaceably on the first supporting bar 3 that is arranged in the centre.

The support on the supporting bar 3 is realised with the aid of a sliding ball bearing. The first supporting bar 3 has two continuous, diametrically opposite grooves in its longitudinal direction which face grooves running in the same direction but are limited in their longitudinal extent, on the inner side of the passage 26 of sleeve 25 that accommodates the first supporting bar 3. In each of the two channels formed by facing grooves, several balls are arranged which have diameters just slightly below that of the channel so that they create a positive clutch between the first supporting bar 3 and the sleeve 25 which with respect to a relative rotation of these two parts only permits a very slight play, so that rotations of the first supporting bar 3 are transmitted with high precision to the sleeve 25 and thus to the displacing wheels 24a, 24b while offering very little resistance to a displacement of the sleeve 25 along the supporting bar 3.

The belt 23a (FIG. 2) runs over a first deflection pulley 27 disposed to the left above the displacing wheel 24a; then it runs around the underside of displacing wheel 24a with which it meshes, and subsequently around a second deflection pulley 28 that is disposed to the right above the displacing wheel 24a and sets the lateral distance between the belt 23a and the supporting bars 3, 4, 5. On account of this guidance of the belt 23a this belt engages over an angle of approximately 180° with the displacing wheel 24a, which ensures nonslip contact without local overload of the belt 23a. The guidance of the belt 23b over the displacing wheel 24b is exactly analogous.

The opening and closing of the gripping tongs 18 is realised via a first angular gear in the slide 11 and a mechanical gripper gear unit in the gripper 14. The first angular gear translates rotations of the second supporting bar 4 into corresponding rotations of the first sliding bar 12. It comprises (FIGS. 3 and 4) a first helical gear 29 which is supported on the third supporting bar 4 via a sleeve 30 onto which this gear is centrally mounted, and a second helical gear 31 supported in the same manner via a sleeve 32 on the first sliding bar 12. The helical gears 29, 31 are engaged with one another. The sleeves 30, 32 are supported on the second supporting bar and first sliding bar 12, respectively, in exactly the same manner as sleeve 25 is supported on the first supporting bar 3.

Figure 5:
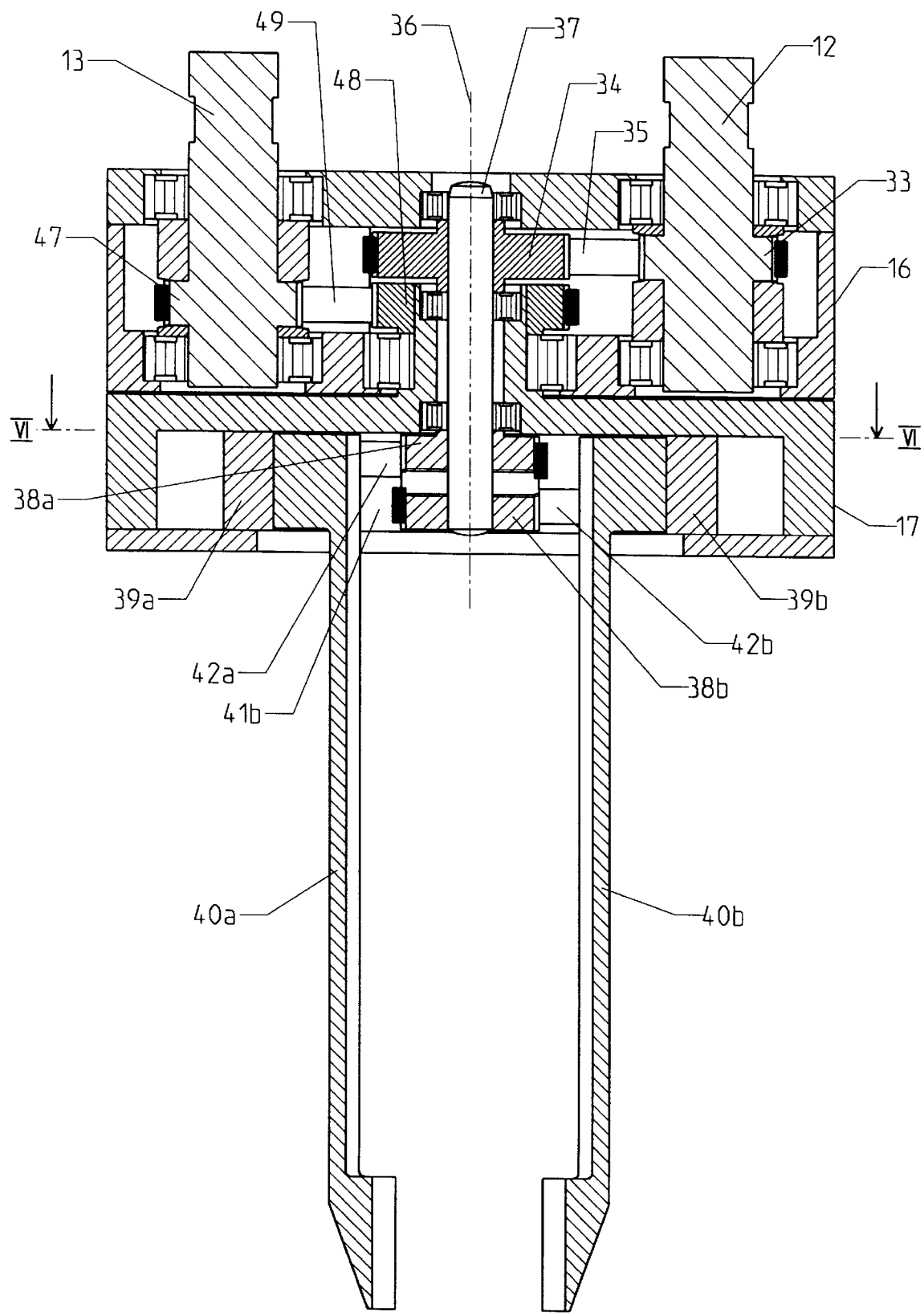
FIG. 5 is a vertical longitudinal section through a further constituent part of the robot arm according to the invention represented in FIG. 1, taken along V—V in FIG. 6.
Figure 6:
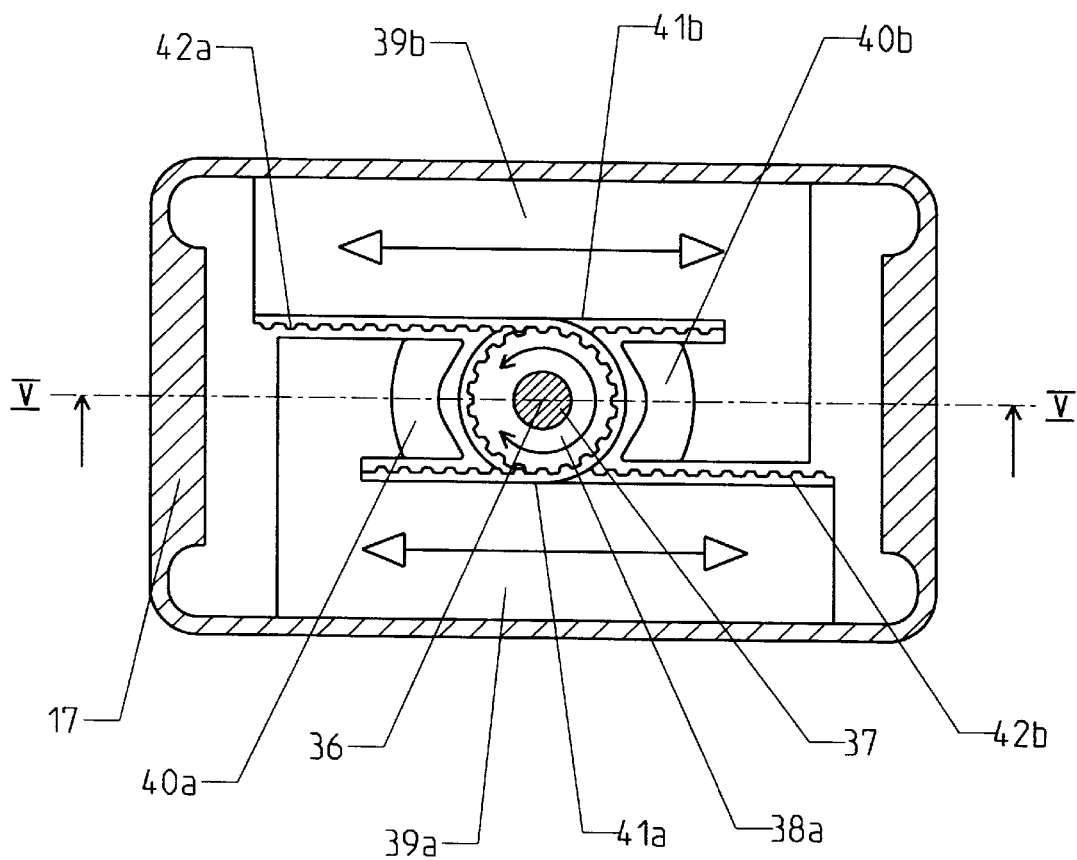
FIG. 6 is a transverse section through the constituent part along VI—VI in FIG. 5.

The gripper gear unit translates rotations of the first sliding bar 12 into corresponding opening and closing movements of the gripping tongs 18. This gear unit comprises (FIGS. 5 and 6) a gripper wheel 33 in the shape of a gear wheel formed integrally with and close to the lower end of the first sliding bar 12, and a gripper pinion 34, while an endless toothed belt 35 runs over the gripper wheel and gripper pinion. The gripper pinion 34 is mounted nonrotatably and close to its upper end on a gripper bolt 37 which in turn is supported rotatably about a rotational axis 36 extending in the z-direction in the gripper housing 16, and projects from this housing holding the parts of the gripper gear unit mentioned up to this point, into the adjacent tong housing 17 below, where a first gear wheel 38a and a second gear wheel 38b are mounted on the bolt at its lower end. The gear wheels 38a, 38b are shaped in like manner, having in particular the same diameter, and are fastened coaxially and nonrotatably on the gripper bolt 37, so that in their place a single, wider gear wheel may also be used.

In the tong housing 17, a first slider 39a and a second slider 39b on which the gripping fingers 40a, 40b are mounted are supported in parallel to one another, and displaceably transversely to the z-direction. The sliders face the gear wheels 38a, 38b situated between them with parallel, straight flanks 41a, 41b. A first toothed belt 42a is fastened on a front end of flank 41a of the first slider 39a that is closest to the gripping finger 40a, and rests against this flank up to the first gear wheel 38a. Here it is turned around while engaging over an angle of 180° the first gear wheel 38a, and then runs to the rear end of flank 41b of the second slider 39b while resting against this flank, and is fastened there to the slider.

In a fully corresponding manner a second toothed belt 42b runs from the rear end of flank 41a of the first slider 39a, where it is fastened, to the second gear wheel 39b while resting against this flank, and at this wheel it is likewise turned around through an angle of 180°, though with the reverse rotational direction with respect to the rotational axis 36, runs further along the flank 41b of the second slider 39b to the front end of the flank closest to the gripping finger 40b, where it is fastened, too. The distance between the two flanks 41a, 41b exactly corresponds to the diameter of the gear wheels 38a, 38b plus twice the thickness of the toothed belts 42a, 42b. Disregarding the vertical transposition of the gear wheels 38a, 38b and toothed belts 42a, 42b, the arrangement exhibits mirror symmetry with respect to the rotational axis 36.

A rotation of the tong housing 17 relative to the gripper housing 16 is realised via a second angular gear in the slide 11 and a mechanical turning gear in the gripper 14. The second angular gear which translates rotational movements of the third supporting bar 5 into corresponding rotational movements of the second sliding bar 13 is constructed (FIGS. 3 and 4) in exactly the same manner as the first angular gear, with a first helical gear 43 sitting on a sleeve 44 supported on the third supporting bar 5 and a second helical gear 45 sitting on a sleeve 46 supported on the second sliding bar 13, and engaged with the first helical wheel.

The turning gear translates rotational movements of the second sliding bar 13 into those of the tong housing 17 which is supported :rotatably about the same rotational axis 36 as the gripper bolt 37 at the gripper housing 16. The turning gear comprises (FIG. 5) a turning wheel 47 integrally formed as a gear wheel with and close to the lower end of the second sliding bar 13, and a turning pinion 48, while an endless toothed belt 49 runs over the wheel and pinion. The turning pinion 48 forms a crown gear nonrotatably connected to the tong housing 17, and is coaxial with the gripper bolt 37 connecting the gripper pinion 34 with the gear wheels 38a, 38b via a central opening in the bolt. The turning wheel 47 and the turning pinion 48 have the same diameters as the corresponding gripper wheel 33 and gripper pinion 34.

If now a particular point characterised by values X, Y, Z for the x, y, and z-coordinate is to be approached by the gripping tongs 18, then the carriage 1 is moved along the rail 2 by the corresponding direct-current servomotor in a basically known manner until the x-coordinate corresponds to the desired value X. The y-coordinate is made to correspond to the desired value Y by driving the pinion 20 and thus the belt 19 with the direct-current servomotor 22, the belt 19 then entrains the slide 11 and displaces it along the supporting bars 3, 4, 5. The z-coordinate finally is adjusted to the desired value Z with the aid of the direct-current servomotor 8 turning the first supporting bar 3, which then (FIG. 2) entrains the displacing wheels 24a, 24b in the slide 11. This causes the belts 23a, 23b guided over the displacing wheels to be displaced in the z-direction and entrain the gripper 14, the sliding bars 12, 13, and the yoke 15.

The opening and closing of the gripping tongs 18 is also realised from the carriage 1. For instance (FIG. 3), if the second supporting bar 4 is rotated by the direct-current servomotor 9 anti-clockwise, as seen from the stop plate 6, then this is translated by the first angular gear in slide 11 into a proportional, clockwise rotation of the first sliding bar 12, as seen from the yoke 15. In the gripper gear unit (FIG. 5), this rotation is transmitted via the gripper wheel 33, belt 35, and gripper pinion 34 to the gripper bolt 37, which in turn transmits it to the gear wheels 38a, 38b. The clockwise rotation of the gear wheels 38a and 38b (FIG. 6) is translated via the first toothed belt 42a into a movement of the second slider 39b to the right, or via the second toothed belt 42b into a movement of the first slider 39a to the left, so that the gripping fingers 40a and 40b separate and the gripping tongs 18 open. In a corresponding manner, an opposite rotation of the second supporting bar 4 by the direct-current servomotor 9 leads to a closing movement of the gripping tongs 18. The displacement of the gripping fingers 40a, 40b is always proportional to the angle of rotation of the second supporting bar 4.

Rotations of the gripping tongs 18 are realised in a similar manner from carriage 1, by turning the third supporting bar 5 with the aid of the direct-current sesrvomotor 10. A clockwise rotation (FIG. 3) is translated into a clockwise rotation with a proportional angle of rotation of the second sliding bar 13 by the second angular gear in the slide 11. The turning gear (FIG. 5) translates this rotation into a proportional rotation of the tong housing 17 via the turning wheel 47, toothed belt 49, and turning pinion 48. The rotation of the second sliding bar 13 is slightly geared down here, since the diameter of the turning pinion 48 is somewhat larger than that of the turning wheel 47. The gripper bolt 37 must be co-rotated in order for the rotation of the tong housing 17 to produce no displacement of the gripping fingers 40a, 40b in this housing. This is realised by an exactly matched compensating rotation of the first sliding bar 12 which is geared down in an exactly corresponding manner. Since the first angular gear and the second angular gear are exactly equivalent and also have the same gear ratio, e.g., 1:1, the compensating rotation of the gripper bolt 37 is produced by a compensating rotation of the third supporting bar 5 exactly matching the rotation of the second supporting bar 4 in its angle of rotation but opposite in the direction of rotation.

The movements described, that is, the displacement of the carriage 1 in the x-direction, of the slide 11 in the y-direction, and of the gripper 14 in the z-direction, as well as the opening, closing, and rotation of the gripping tongs 18 may be executed consecutively or, with a suitable central control unit, even simultaneously.

Figure 7:
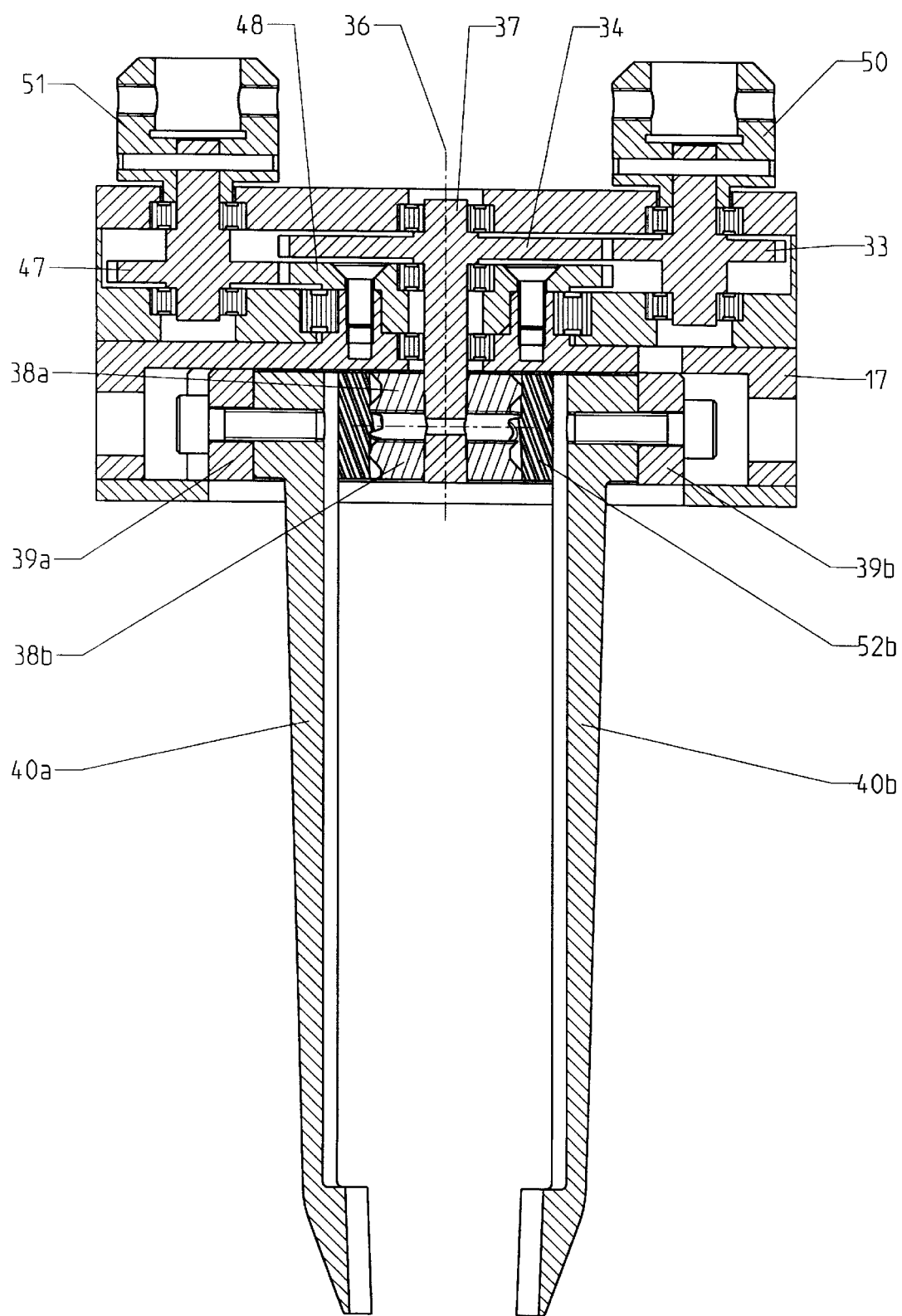
FIG. 7 is a vertical longitudinal section through a modified embodiment of the constituent part represented in FIGS. 5 and 6, of the robot arm according to the invention, following a section taken along VII—VII in FIG. 8.
Figure 8:
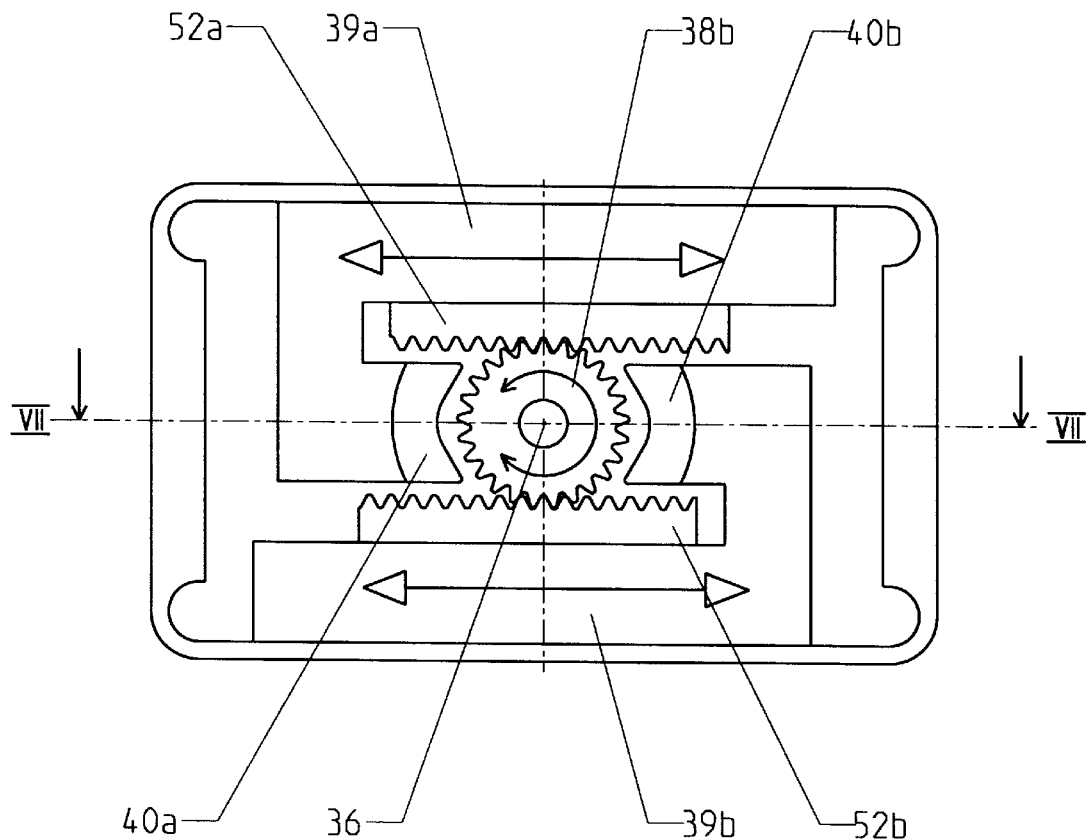
FIG. 8 is a view of the constituent part of FIG. 7 from below.

According to a modified embodiment (FIGS. 7 and 8) of the gripper 14 which, however, in its basic design corresponds to that described above with reference to FIGS. 5 and 6, the sliding bars 12, 13 (not shown) are accommodated by sleeves 50, 51 which are rotatably supported in the gripper housing 16 and hold the gripper wheel 33 or the turning wheel 47. The gripper wheel 33 here meshes directly with the gripper pinion 34, the same is true for the turning wheel 47 and the turning pinion 48. In a similar manner the slides 39a, 39b have gear racks 52a, 52b directly meshing with the gear wheels 38a, 38b. The accuracy of the control is better and the dynamic characteristics of the gripper are simpler because of the direct operating connections realised without belts.

In the design of the individual parts various modifications are possible as well without departing from the scope of the invention. For example, instead of the direct-current servomotors other electric motors that can be controlled or regulated may be used, in particular stepping motors. The supporting and sliding bars may have a design different from that described, e.g., comprise a different number of grooves. The crucial point is their ability to transmit torques. For the angular gears, too, other embodiments are of course conceivable, such as worm gears.

| List of reference symbols | |
|---|---|
| 1 | carriage |
| 2 | rail |
| 3, 4, 5 | supporting bars |
| 6 | stop plate |
| 7 | angle bracket |
| 8, 9, 10 | direct-current servomotors |
| 11 | slide |
| 12, 13 | sliding bars |
| 14 | gripper |
| 15 | yoke |
| 16 | gripper housing |
| 17 | tong housing |
| 18 | gripping tongs |
| 19 | belt |
| 20 | pinion |
| 21 | deflection pulley |
| 22 | direct-current servomotor |
| 23a, 23b | belt |
| 24a, 24b | displacing wheels |
| 25 | sleeve |
| 26 | passage |
| 27, 28 | deflection pulleys |
| 29 | helical gear |
| 30 | sleeve |
| 31 | helical gear |
| 32 | sleeve |
| 33 | gripper wheel |
| 34 | gripper pinion |
| 35 | toothed belt |
| 36 | rotational axis |
| 37 | gripper bolt |
| 38a, 38b | gear wheels |
| 39a, 39b | sliders |
| 40a, 40b | gripping fingers |
| 41a, 41b | flanks |
| 42a, 42b | toothed belts |
| 43 | helical gear |
| 44 | sleeve |
| 45 | helical gear |
| 46 | sleeve |
| 47 | turning wheel |
| 48 | turning pinion |
| 49 | toothed belt |
| 50, 51 | sleeves |
| 52a, 52b | gear racks |

What is claimed is:

1. A robot arm comprising:

a gripper having a tong housing and gripping tongs having two gripping fingers, at least one gripping finger being movably supported in the tong housing;

a gripper housing rotatably supporting the tong housing about a rotational axis;

a pair of sliding bars oriented parallel to a z-direction, the bars non-rotatably suspending the gripper housing, the second one of the pair of sliding bars being operatively connected to the tong housing, wherein rotations of the second sliding bar are translated into rotations of the tong housing; and a gripper bolt for placing the at least one gripping finger in operative connection with the first sliding bar, the gripper bolt coaxial with the rotational axis so that rotations of the first sliding bar are translated into movements of the at least one gripping finger.

2. A robot arm according to claim 1, wherein the gripper bolt is in operative connection with the first sliding bar so that rotations of the first sliding bar are translated into corresponding rotations of the gripper bolt.

3. A robot arm according to claim 2, wherein the two gripping fingers are fastened to a pair of sliders displaceably supported in the tong housing and in operative connection with the gripper bolt so that rotations of the gripper bolt are translated into corresponding mutually opposite displacements of each of the sliders.

4. A robot arm according to claim 3, further comprising at least one gear wheel held by the gripper bolt and disposed between the pair of sliders.

5. A robot arm according to claim 4, further comprising a first toothed belt starting from a front end of the first slider of the pair of sliders runs over the at least one gear wheel to a rear end of the second slider, and a second toothed belt oriented in the opposite direction of rotation with respect to the rotational axis starting from a front end of the second slider runs to a rear end of the first slider.

6. A robot arm according to claim 5, wherein, the first slider comprises a first straight flank on a side facing the at least one gear wheel, the first toothed belt resting on the first straight flank between the front end of the first slider and the at least one gear wheel, and the second toothed belt rests between the rear end of the first slider and the at least one gear wheel; and the second slider comprising a second straight flank parallel to the first straight flank on a side of the second slider facing the at least one gear wheel, the second toothed belt resting on the second straight flank between the front end of the second slider and the at least one gear wheel, and the first toothed belt rests between the rear end of the second slider and the at least one gear wheel.

7. A robot arm according to claim 4, wherein each of the sliders further comprises toothings which mesh with the at least one gear wheel.

8. A robot arm according to claim 1, wherein the operative connection between the tong housing and the first sliding bar comprises a crown gear non-rotatably connected to the tong housing and oriented coaxial with the rotational axis.

9. A robot arm according to claim 1, wherein the pair of sliding bars are supported longitudinally displaceable in a slide and the gripper is non-displaceably suspended from the pair of sliding bars.

10. A robot arm according to claim 9, wherein the slide for displacement of the gripper in the z-direction comprises a displacing gear with at least one drivable displacing wheel over which at least one belt runs from the gripper to the ends of the sliding bars that are turned away from the gripper and where the belt is fastened.

11. A robot arm according to claim 10, wherein the slide is displaceably suspended from at least three parallel supporting bars which extend transversely to the z-direction in a y-direction and are rotatably supported in a carrier, the at least one displacing wheel being displaceably and non-rotatably supported on a first one of the supporting bars, the slide having a first angular gear that translates rotations of a second one of the supporting bars into rotations of the first sliding bar, and a second angular gear which translates rotations of a third one of the supporting bars into rotations of the second sliding bar.

12. A robot arm according to claim 11, wherein each of the first and second angular gears comprises a first helical gear non-rotatably supported on the corresponding supporting bar and a second helical gear non-rotatably supported on the corresponding one of the sliding bars, each second helical gear meshing with the first helical gear.

13. A robot arm according to claim 11, wherein the slide is displaceable along the three supporting bars with the aid of a belt connected with the slide, the belt being doubled in the y-direction, being driven at the carrier and turned around at the ends of the supporting bars which are turned away from the carrier.

14. A robot arm according to claim 11, wherein the carrier is designed as a carriage displaceable along a stationary rail extending in an x-direction transverse to each of the y-direction and z-direction.

* * * * *